United States Patent Office 2,895,811
Patented July 21, 1959

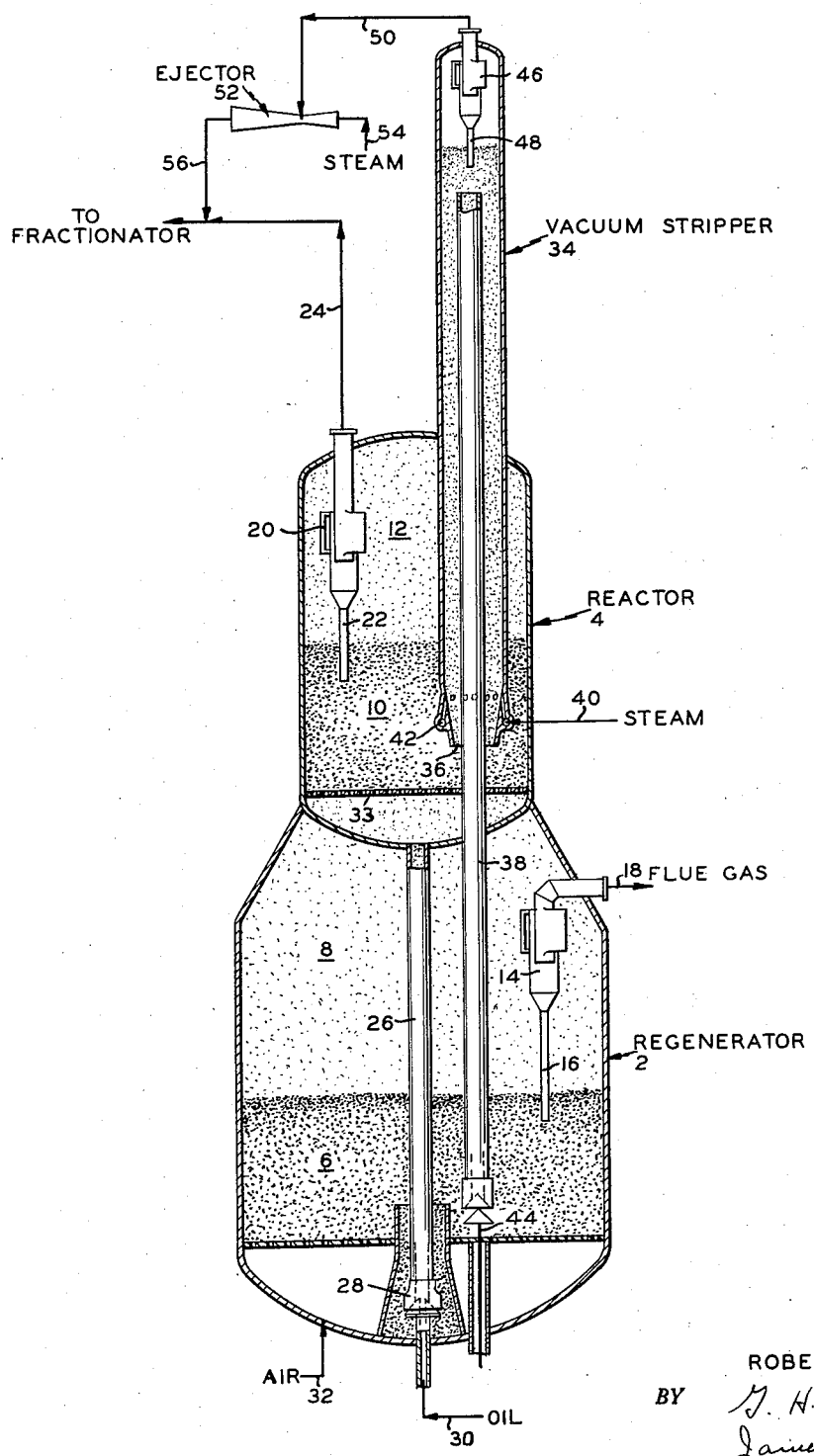

2,895,811

UNITARY VESSEL CATALYTIC REACTOR, REGENERATOR AND VACUUM STRIPPER

Robert P. Schaaf, Livingston, N.J., assignor to The M. W. Kellogg Company, Jersey City, N.J., a corporation of Delaware Application November 7, 1955, Serial No. 545,323

2 Claims. (Cl. 23—288)

This invention relates to an apparatus for catalytic conversion process and to an apparatus for use therein, and more particularly relates to an apparatus for catalytically cracking high boiling hydrocarbons to gasoline having a high anti-knock rating.

It is conventional to crack high boiling hydrocarbons in conversion systems utilizing fluidized beds of catalyst in a reactor and regenerator. In these systems, the reactor and regenerator may be mounted side by side, or the reactor may be mounted above or below the regenerator. It is also conventional to strip the catalyst withdrawn from the reactor by means of a stripping gas, such as steam for example, in a stripper which may be a compartment within the reactor itself or a seperate vessel. In some cases, the regenerated catalyst is stripped with a stripping gas such as steam to remove any products of combustion, which may be occluded on the catalyst as a result of the regenerating operation, before the catalyst is transferred from the regenerator to the reactor.

In accordance with the present invention, a process and apparatus are provided in which the spent catalyst withdrawn from the reactor is stripped in a stripping zone which is maintained at sub-atmospheric pressure, i.e., under a partial vacuum. The stripper may be mounted either wholly or partially within the reactor or may be a separate vessel, and if desired, the regenerated catalyst may also be subjected to a vacuum stripping operation, although the necessity for stripping the spent catalyst is much greater than the necessity for stripping the regenerated catalyst.

The use of the vacuum stripper results in lower coke yields and higher liquid yields, since hydrocarbons which cannot be stripped in conventional strippers become volatilized at subatmospheric pressures and can be recovered. The utility of the present process becomes apparent when it is considered that an increase in hydrocarbon recovery equivalent to as little as 0.5 percent carbon, based upon feed, may increase the capacity of a cracking unit by as much as 10 percent.

The vacuum stripper of the present invention will be described in conjunction with a catalytic cracking apparatus in which the reactor is mounted above the regenerator and solids transfer between the two vessels is performed in substantially straight vertical transfer lines. Apparatus of this type is disclosed in application S.N. 496,412, filed March 24, 1955. In the present modification of this apparatus, a vaporous hydrocarbon is contacted with a dense fluidized bed of a finely divided catalytic material under suitable conversion conditions in a reaction zone producing a reaction product and contaminating the catalyst with carbonaceous material and volatile hydrocarbons. A portion of the contaminated catalyst from the dense bed in the reaction zone is passed upwardly as a dense mass in a stripping zone concurrently with a gasiform stripping agent, such as steam, which is utilized to strip volatile hydrocarbon material from the contaminated catalyst. The stripped catalyst is then passed into a regeneration zone located below the reaction zone, the regeneration zone having a dense fluidized bed therein. An oxygen-containing gas is passed upwardly through the catalyst bed in the regeneration zone to burn the carbonaceous material from the spent catalyst in the regeneration zone, from which the regenerated catalyst and at least a part of the hydrocarbon feed material are passed upwardly through a regenerated catalyst riser into the reaction zone.

Although the specific embodiment of the invention described is that in which the reactor is mounted above the regenerator, the vacuum stripper can be used with any fluid catalytic convertor design.

The conditions used in the process of the present invention may be substantially the same as those described in the above mentioned copending application, i.e., the superficial linear velocity in the regenerated catalyst riser may be between about 15 to about 60 feet per second and this velocity is decreased to about 0.5 to about 3.0 feet per second in the distribution zone, which is the zone formed by the bottom of the reactor and a foraminous plate which extends laterally of the reactor at a point above the bottom thereof. The regenerated catalyst is passed through the foraminous plate at a pressure drop of about 0.25 to about 2.5 p.s.i. Of course, the foraminous plate may be eliminated, if desired.

The apparatus and process of this invention are applicable to the catalytic cracking of high boiling hydrocarbons such as residual oils, gas oils and the like by means of suitable cracking catalysts such as a siliceous material containing about 75 and 99 percent silica with the remainder being one or more different catalytic materials such as alumina, boria, magnesia, zirconia and the like. The cracking reaction is performed at a temperature of about 800 to 1025° F. and preferably in the range of about 850 to 975° F. The pressure used is generally in a range of about 1 atmosphere to about 50 p.s.i.g. and preferably is in a range of about 5 to 25 p.s.i.g. The weight space velocity, measured as pounds of oil charged to the reacion zone per pound of catalyst therein, may be between 0.25 and about 10 and preferably about 0.5 and 5. The rate of catalyst to oil, on a weight basis, varies from about 2 to 30, preferably about 5 to 15, as it is desired to utilize the heat of combustion in the regeneration zone for the endothermic cracking reactions and to maintain a desired level of catalyst activity in the cracking zone. The contaminated catalyst withdrawn from the reaction zone is regenerated at a temperature of about 750 to 1200° F., preferably 950 to 1150° F., at a pressure between about 1 atmosphere and 50 p.s.i.g.

The spent catalyst withdrawn from the reactor is stripped at a temperature in the same range as the reaction temperature but the stripping temperature may vary from the reaction temperature as a result of the use of a gasiform stripping agent having a higher or lower temperature than that of the reaction zone. The gasiform stripping agent can be steam, hydrogen, a gaseous hydrocarbon, such as methane, ethane, propane and the like or mixtures thereof. In the stripping zone, the pressure may vary from substantially reactor pressure at the bottom of the stripping zone to a sub-atmospheric pressure in upper portions of the stripping zone, the lowest pressure existing at the top thereof. The top of the stripping zone is maintained at a sub-atmospheric pressure which may be in the range of about 0.1 to 14 p.s.i.a. and is preferably in the range of about 1 to 5 p.s.i.a. The reduced pressure is maintained in the stripping zone by the connection of a vacuum pump, steam ejector or other suitable means thereto. The stripping zone, which was used in the example which follows, is somewhat elongated in shape so that the pressure varies considerably from the top to the bottom of the zone, but by utilizing equipment in which the catalyst flow from the reactor to the stripper is regulated by a slide valve or a plug valve and by using a vacuum producing means of sufficient capacity, at least a partial vacuum may be maintained at all times throughout the stripping zone whereby very effective stripping of the spent catalyst is performed. When a valve is used to control the catalyst flow from the reactor to the stripper, the stripper need not be elongated.

The vaporous products stripped from the spent catalyst, together with the stripping gas, are passed out of the stripping zone through a separating apparatus, such as a cyclone, which serves to separate any entrained catalyst therefrom, and the mixture of vaporous products and stripping gas is then combined with the product stream from the reactor and passed to the product fractionator for recovery of the various fractions therein.

Referring to the accompanying drawing, which is a diagrammatic illustration of apparatus in elevation, the regenerator 2 has the reactor 4 mounted on the top thereof, the regenrator having the dense fluidized bed 6 therein and the dilute phase 8 therein and the reactor having the dense phase 10 and the dilute phase 12 therein.

The regenerator is provided with the cyclone separator 14 having the dipleg 16 thereon extending below the surface of the dense phase 6. Flue gases are discharged from the regenerator through the cyclone separator 14 and the line 18. The reactor is similarly provided with the cyclone 20 having the dipleg 22 extending below the surface of the dense phase 10. Cracked products are discharged from the reactor 4 through the cyclone separator and the line 24 by means of which they are transferred to the product fractionator, not shown.

Regenerated catalyst is transferred from the regenerator 2 to the reactor 4 through the regenerated catalyst riser 26 which engages the injector valve 28 at the lower end thereof. Details of this injector valve are described in copending application Serial Number 724,956, filed January 29, 1947, now U.S. Patent 2,630,352. The hydrocarbon feed which is preferably preheated, with or without vaporization and with or without a dispersing medium such as steam, is introduced through the line 30 from which it is passed to the injector valve 28 and into the regenerated catalyst riser 26, carrying into the catalyst riser regenerated catalyst from the dense bed 6. The regenerated catalyst is distributed in the reactor by the grid 33. Air or other oxygen-containing gas is introduced into the dense bed, to burn carbonaceous deposits from the catalyst being regenerated, through the line 32.

Spent catalyst is withdrawn from the reactor 4 into the stripper 34 through the annular entrance 36 at the bottom of the stripper 34, this annular entrance being formed by the tapered bottom of the stripper which is concentric with the catalyst standpipe 38. Stripping gas such as steam is injected through the line 40 into the distributing ring 42 from which it passes into the stripper 34 adjacent the bottom thereof and strips the upflowing spent catalyst in the annular well fromed by the cylindrical stripper which is concentrically mounted about the catalyst standpipe 38. The upflowing catalyst passes from the annular well into the catalyst standpipe 38 and flows downwardly therein to the regenerator 2, the rate of flow of the stripped catalyst being controlled by the plug valve 44.

A cyclone separator 46 is mounted in the top of the stripper vessel and has the dipleg 48 extending below the surface of the catalyst therein. The mixture of stripping gas and materials stripped from the spent catalyst is withdrawn from the stripper through the line 50 as a result of the partial vacuum imposed upon the stripper by means of the steam ejector 52 having the steam connection 54. From the ejector 52, the materials withdrawn from the stripper are passed through the line 56 and are mixed with the reaction products withdrawn through the line 24.

The invention will be further illustrated by reference to the following example:

EXAMPLE 1

To illustrate the application of this invention to a process for catalytically cracking hydrocarbons, the following conditions are suitable for operation of a convertor having a capacity of 10,000 barrels per day of heavy gas oil feed, the convertor design being substantially that shown in the accompanying drawing.

*Table I*

Reactor:
| | | |
|---|---|---|
| Temperature | °F | 900 |
| Space velocity | wt | 1.0 |
| Catalyst: oil ratio | wt | 10.1 |
| Pressure | p.s.i.g | 6.0 |
| Bed density | lbs./cu. ft | 35 |
| Bed velocity (average) | ft./sec | 1.14 |
| Grid pressure drop | lb./sq. in | 1 |
| Bed pressure drop | lbs./sq. in | 3 |
| Cyclone pressure drop | lb./sq. in | 0.5 |
| Outlet line velocity | ft./sec | 101 |
| Catalyst bed | tons | 80 |
| Catalyst bed, L/D | | 1.25 |

Regenerator:
| | | |
|---|---|---|
| Temperature | °F | 1100 |
| Bed density | lbs./cu. ft | 30 |
| Bed velocity (average) | ft./sec | 1.25 |
| Grid pressure drop | lb./sq. in | 1 |
| Bed pressure drop | lbs./sq. in | 3.0 |
| Cyclone pressure drop | lb./sq. in | 0.5 |
| Inlet line velocity | ft./sec | 150 |
| Outlet line velocity | ft./sec | 100 |
| Catalyst bed | tons | 125 |
| Cataylst bed, L/D | | 0.70 |

Spent catalyst stripper:
| | | |
|---|---|---|
| Bed density | lbs./cu. ft | 25 |
| Bed velocity (average) | ft./sec | 2 |
| Bed pressure drop | p.s.i.g | 21 |
| Pressure | p.s.i.a | 1 |

Transfer line stystem:
| | | |
|---|---|---|
| Standpipe catalyst density | lbs./cu. ft | 30 |
| Standpipe pressure head | lbs./sq. in | 36 |
| Standpipe velocity | ft./sec | 0.3 |
| Standpipe valve pressure drop | lbs./sq. in | 5.5 |
| Carrier line density | lbs./cu. ft | 2 |
| Carrier line pressure drop | lbs./sq. in | 2 |
| Carrier line velocity | ft./sec | 30 |
| Injector valve pressure drop | lbs./sq. in | 6.5 |

Since the catalyst goes up the elongated stripper to enter the standpipe, the pressure on the upward flowing catalyst continually falls, reaching its lowest value just as the catalyst enters the standpipe. The catalyst is carried upward by the stripping steam and, for a given steam linear velocity, a very low mass velocity is required due to the low pressure existing in the stripper. Because of the large difference in pressure between the bottom and the top of the stripper, there will be a large difference in linear velocity between the bottom and the top, if the stripper is cylindrical in shape, which can be minimized by tapering the vessel.

The size of the stripper is dependent, to a degree, upon the pressure existing therein, since in general, the lower the pressure in the stripper, the taller the unit will have to be.

It will be obvious to those skilled in the art that many modifications may be made within the scope of the present invention without departing from the spirit thereof, and the invention includes all such modifications.

I claim:

1. A unitary apparatus comprising in combination, an upper chamber and a lower chamber, each of said chambers adapted to contain a dense fluidized bed of finely divided contact material, a first open end conduit extending from the lower portion of said lower chamber into the bottom of said upper chamber for transfer of finely divided contact material upwardly therethrough, a hollow stem plug valve aligned with the bottom of said first open end conduit, an elongated cylindrical chamber open at the bottom extending from the lower portion of said upper chamber upwardly therethrough, conduit means attached to the lower portion of said elongated cylindrical chamber for the introduction of a gaseous material thereto, said elongated cylindrical chamber adapted for the flow of contact material upwardly therethrough to the upper portion thereof, separator means in the upper portion of said elongated cylindrical chamber for the separation of finely divided contact material from gaseous material, an ejector means connected to said separator means for maintaining a lower pressure in the upper portion of said cylindrical chamber than in the lower portion thereof, a second open end conduit coaxially positioned within and extending from the upper portion of said elongated cylindrical chamber downwardly therethrough to the lower portion of said lower chamber, a plug valve aligned with the bottom of said second open end conduit, conduit means for withdrawing vaporous material from the upper portion of said upper chamber, conduit means for withdrawing gaseous material from the upper portion of said lower chamber and conduit means for introducing a gaseous material to the lower portion of said lower chamber.

2. A unitary apparatus comprising in combination an upper chamber and a lower chamber, said lower chamber being of larger diameter than said upper chamber, a first conduit open at its bottom end extending from the lower portion of said upper chamber upwardly therethrough to above said upper chamber, a header means associated with the lower portion of said first conduit and having a plurality of upwardly extending openings around the periphery thereof for directing a gaseous material upwardly therethrough, means to admit gaseous material to said header, ejector means attached to said first conduit for removal of gasiform material from the upper end of said first conduit and for maintaining subatmospheric pressure conditions at the top thereof, a second open end conduit positioned within and extending from the upper portion of said first conduit downwardly therethrough to the lower portion of said lower chamber, a vertically movable plug valve aligned with the bottom open end of said second conduit, a third open end circuit extending from the lower portion of said lower chamber upwardly into the bottom of said upper chamber, a vertically movable hollow stem plug valve aligned with the bottom open end of said third conduit, means to admit fluidizing media to said hollow stem plug valve, means for removing a gaseous material from the upper portion of said first conduit, and means to admit fluidizing gas to said lower chamber.

References Cited in the file of this patent
UNITED STATES PATENTS

| | | |
|---|---|---|
| 2,447,116 | Collins | Aug. 17, 1948 |
| 2,457,232 | Hengstebeck | Dec. 28, 1948 |
| 2,509,745 | Riggs | May 30, 1950 |
| 2,658,822 | Hengstebeck | Nov. 10, 1953 |
| 2,671,102 | Jewell | Mar. 2, 1954 |